United States Patent
Akutsu et al.

(10) Patent No.: US 8,541,490 B2
(45) Date of Patent: Sep. 24, 2013

(54) ALIPHATIC POLYESTER RESIN COMPOSITION AND PROCESS FOR PRODUCTION THEREOF

(75) Inventors: Fumio Akutsu, Tokyo (JP); Naoki Hayashi, Tokyo (JP); Hiroyuki Sato, Tokyo (JP); Masumi Shibata, Tokyo (JP); Akiko Watanabe, Tokyo (JP)

(73) Assignee: Kureha Corporation, Tokyo (JP)

( * ) Notice: Subject to any disclaimer, the term of this patent is extended or adjusted under 35 U.S.C. 154(b) by 0 days.

(21) Appl. No.: 13/442,948

(22) Filed: Apr. 10, 2012

(65) Prior Publication Data

US 2012/0259047 A1 Oct. 11, 2012

(30) Foreign Application Priority Data

Apr. 11, 2011 (JP) ................................. 2011-087315
Apr. 4, 2012 (JP) ................................. 2012-085606

(51) Int. Cl.
*C08K 5/521* (2006.01)

(52) U.S. Cl.
USPC ........... 524/140; 524/133; 524/136; 524/139; 524/147

(58) Field of Classification Search
USPC .......................... 524/133, 136, 139, 140, 147
See application file for complete search history.

(56) References Cited

U.S. PATENT DOCUMENTS

| 5,686,540 | A | * | 11/1997 | Kakizawa | ..................... | 525/444 |
| 2007/0100037 | A1 | * | 5/2007 | Sato et al. | ..................... | 524/115 |
| 2008/0167409 | A1 | * | 7/2008 | Hokari et al. | ................. | 524/145 |

* cited by examiner

*Primary Examiner* — Peter Szekely
(74) *Attorney, Agent, or Firm* — Wenderoth, Lind & Ponack, L.L.P.

(57) ABSTRACT

A process for producing an aliphatic polyester resin composition, wherein an aliphatic polyester resin is melt-kneaded with a phosphoric acid ester having a reduced moisture content of 1.5 wt. % or less. As a result, an aliphatic polyester resin composition having an improved moisture resistance is provided.

7 Claims, 2 Drawing Sheets

ALIPHATIC POLYESTER RESIN COMPOSITION AND PROCESS FOR PRODUCTION THEREOF

TECHNICAL FIELD

The present invention relates to an aliphatic polyester resin composition and a process for production thereof, especially a manner of compounding a phosphoric acid ester additive with the aliphatic polyester resin.

BACKGROUND ART

Aliphatic polyesters represented by polylactic acid, polyglycolic acid, etc. are excellent in biodegradability. Especially polyglycolic acid (hereinafter sometimes referred to as "PGA") is excellent in heat resistance, gas-barrier property, mechanical strength, etc., so that application thereof for providing various sheets, films, containers, injection molding articles, textiles, fine particulate materials, etc., by itself or as a composite material with another resin material.

For the purpose of improving heat stability in melt-processing, such an aliphatic polyester resin is compounded with a phosphoric acid ester, followed by melt-kneading, to produce an aliphatic polyester composition (for example, Patent documents 1-2).

PRIOR ART DOCUMENTS

Patent Documents
Patent document 1: WO 2006/095526
Patent document 2: JP2007-126653A

SUMMARY OF THE INVENTION

Aliphatic polyester resin compositions are generally hydrolyzable so that their gas-barrier properties and mechanical strengths can be lowered depending on the extent to which they have been hydrolyzed. A phosphoric acid ester has a function of improving the thermal stability of an aliphatic polyester resin composition to suppress thermal degradation of the aliphatic polyester resin composition, and is also effective for improving the moisture resistance of the aliphatic polyester resin composition. Commercially available phosphoric acid esters usually contain relatively high moisture content. For use in the aliphatic polyester resin composition, such a phosphoric acid ester is contained therein in an amount as very small as several hundreds of ppm with respect to the whole composition. Thus, moisture contained in the phosphoric acid ester has been presumed to have no influence on the quality, such as moisture resistance, of the aliphatic polyester resin composition. For this reason, such a commercially available phosphoric acid ester has been conventionally used as it is, and the need for strict control of its moisture content has not been recognized heretofore.

Meanwhile, the present inventors have conducted earnest studies for improving the moisture resistance as a quality of the aliphatic polyester resin composition. As a result, the present inventors have found that: an extremely small amount of moisture contained in a phosphoric acid ester influences the moisture resistance of the aliphatic polyester resin composition; the control of the moisture content to below a specific value allows production of an aliphatic polyester resin composition having particularly stable moisture resistance among other properties; and further reduction of the moisture content allows further improvement in moisture resistance as ever. Incidentally, it has been already known that a moisture content in an aliphatic polyester resin composition is related to its moisture resistance (see FIG. 2). Moisture in phosphoric acid ester used as a component in the composition may be presumed to also affect the moisture resistance. The present inventors, however, have found that, surprisingly, moisture in phosphoric acid ester has a much severer influence on the moisture resistance (see FIG. 1) than the previously known effect of moisture in the composition. The present invention has been completed on the basis of these findings.

The relation between a moisture content in a conventional polyglycolic acid resin composition and its moisture resistance has been obtained as shown in FIG. 2. Specifically, the previous findings based on this drawing show that when the moisture content in the polyglycolic acid resin composition decreases by 2 ppm, a time required for the weight-average molecular weight of the polyglycolic acid to reach 70,000 (from an initial weight-average molecular weight of 190,000) increases by about 1.2 hours (because of improved moisture resistance imparted thereto delaying a time required for hydrolysis). In contrast thereto, the relation of a moisture content in phosphoric acid ester to moisture resistance has been found as shown in FIG. 1 for a polyglycolic acid resin composition containing 200 ppm of phosphoric acid ester added thereto. Specifically, a 1 wt. % change in moisture content in phosphoric acid ester results in only a 2 ppm change in moisture content in the polyglycolic acid resin composition. This moisture content change in phosphoric acid ester provides an extra time as long as about 16 hours during which the polyglycolic acid resin composition resists decomposition with moisture. Thus, the moisture content reduction in phosphoric acid ester remarkably acts on improvement in moisture resistance of the polyglycolic acid resin composition containing the phosphoric acid ester.

The present invention has been made based on the above finding. An object of the present invention is to provide an aliphatic polyester resin composition and process for production thereof having an improved moisture resistance.

According to the present invention, there is provided a process for producing an aliphatic polyester resin composition, comprising: melt-kneading an aliphatic polyester resin with a phosphoric acid ester having a moisture content of 1.5 wt. % or less.

According to the present invention, there is further provided an aliphatic polyester resin composition produced by the process.

Thus, the present invention provides an aliphatic polyester resin composition having improved moisture resistance and a process for production thereof.

DETAILED DESCRIPTION

Figure 1:
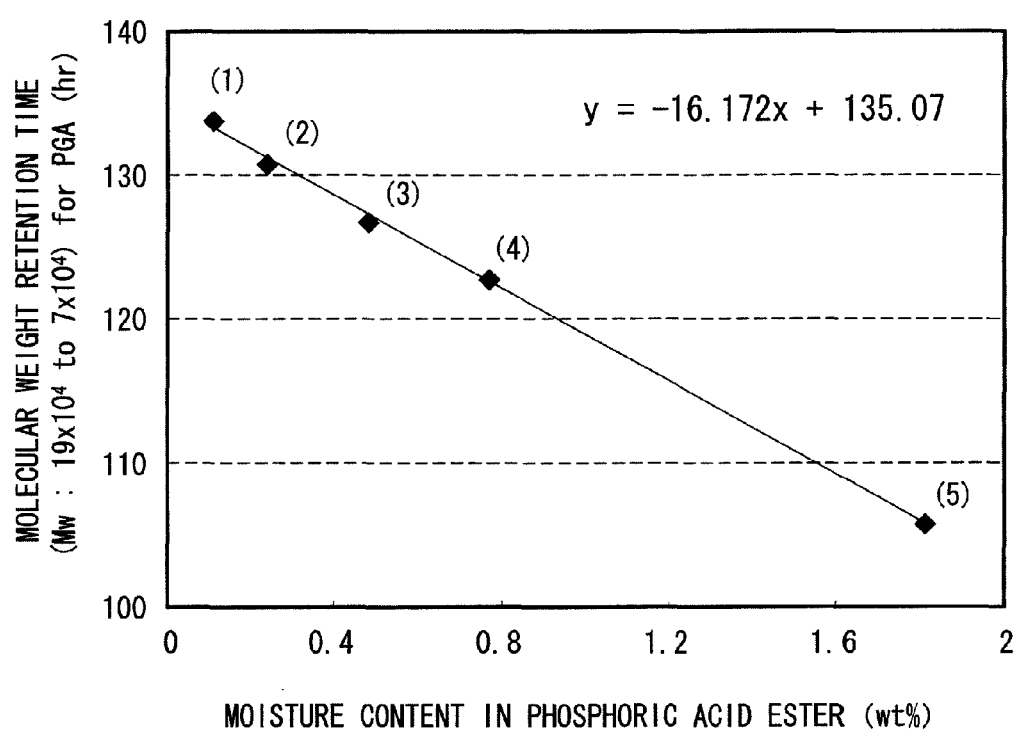
FIG. 1 shows a relation between a moisture content (wt. %) of a phosphoric acid ester, and a molecular weight retention time down to a weight-average molecular weight (Mw) of $7 \times 10^4$ from $19 \times 10^4$ of PGA.

Hereafter, some preferred embodiments of the aliphatic polyester resin composition and process for production thereof according to the present invention are described.

(Aliphatic Polyester Resin)

The aliphatic polyester resin constituting the aliphatic polyester resin composition may comprise homopolymers and copolymers of aliphatic ester monomers, inclusive of: glycolic acid including glycolic acid and glycolide which is a bimolecular cyclic ester of glycolic acid; cyclic monomers, inclusive of ethylene oxalate (i.e., 1,4-dioxane-2,3-dione); lactides; lactones, such as β-propiolactone, β-butyrolactone; β-pivalolactone, γ-butyrolactone, δ-valerolactone, β-methyl-δ-valerolactone, and ε-caprolactone; carbonates, such as tri-methylene carbonate; ethers, such as 1,3-dioxane; ether-esters, such as dioxanone; and amides, such as ε-caprolactam; hydroxycarboxylic acids, such as lactic acid, 3-hydroxypropanoic acid, 3-hydroxybutanoic acid, 4-hydroxybutanoic acid and 6-hydroxycaproic acid, and their alkyl esters; substantially equal molar mixtures of aliphatic diols, such as ethylene glycol and 1,4-butane diol with aliphatic dicarboxylic acids, such as succinic acid and adipic acid, and their alkyl or aromatic esters.

(Polyglycolic Acid Resin)

Among these aliphatic polyester resins, it is preferred to use a polyglycolic acid resin comprising homopolymer or a copolymer of glycolic acid, which is excellent in heat resistance, gas-barrier property and mechanical strength.

More specifically, the polyglycolic acid resin may comprise homopolymer consisting of recurring glycolic acid unit represented by a formula: —(—O—$CH_2$—C(O)—)— alone or a copolymer containing at least 60 wt. % of the recurring glycolic acid unit. The content of the recurring glycolic acid unit referred to above may be at least 60 wt. %, preferably at least 70 wt. %, more preferably at least 80 wt. % contained in the polyglycolic acid resin. Too low a content of the recurring glycolic acid unit, leads to a lowering in crystallinity and inferior heat resistance, intensity, and stability.

The polyglycolic acid resin may be synthesized, by ring-opening polymerization of glycolide (as a bimolecular cyclic ester of glycolic acid) alone or with another cyclic ester as an optional copolymerization element, in addition to condensation polymerization for homopolymerization or copolymerization of glycolic acid alone or with another monomer.

The polyglycolic acid resin used in the present invention may preferably have a melt viscosity of 100-10,000 Pas, more preferably 300-8,000 Pas, particularly preferably 400-5,000 Pas, when measured under the conditions of a temperature of 240° C. and a shear rate of 122 $sec^{-1}$.

(Phosphoric Acid Ester)

The polyglycolic acid resin composition contains a phosphoric acid ester for improving the thermal stability, preferably in a proportion of 0.003-3 wt. parts, further preferably 0.005-1 wt. part, per 100 wt. parts of the polyglycolic acid resin as a main component. If the phosphoric acid ester is used below 0.003 wt. part, it is difficult to attain a sufficient thermal stability improvement effect; and if used in excess of 3 wt. parts, the melt-kneading is liable to be insufficient.

Furthermore the phosphoric acid ester should be dried before melt kneading with main component of the aliphatic polyester resins, to have a reduced moisture content of at most 1.5 wt. %, preferably at most 0.7 wt. %. If the moisture content excess 1.5 wt. parts, the moisture resistance of the aliphatic polyester resin composition is impaired.

The phosphoric acid ester may preferably be a phosphorus compounds having at least one hydroxyl group and at least one long-chain alkyl ester group. The number of carbon atoms in the long-chain alkyl is preferably within a range of 8 to 24. If the number of carbon atoms is below 8, it is liable to volatilize and the addition thereof becomes difficult at the melting temperature and in excess of 24, the melt kneading is liable to be insufficient.

In the case of being added in the form of a solid, the phosphoric acid ester may preferable be in a particulate form from a viewpoint of stable injection, particularly with particle diameter of at most 3.0 mm for continuous feed at a rate of at most 500 g/h and with particle diameter of at most 2.0 mm for continuous feed at a rate of at most 300 g/h.

If the particle diameter is excessively large the rate of injection will become unstable. As a particularly preferred example of the phosphoric acid ester, mono- or di-stearyl acid phosphoric acid ester is applicable.

Other applicable phosphoric acid esters may include those having a pentaerythritol skeleton, such as cyclic neopentane-tetra-il-bis(2,6-di-tert-butyl-4-methylphenyl)phosphite, cyclic neopentane-tetrayl-bis(2,4-di-tert-butylphenyl)phosphite, and cyclic neopentane-tetrayl-bis(octadecyl)phosphite.

These phosphoric acid esters can be used alone or in combination of two or more species thereof.

Examples of methods for adjusting the moisture content of the phosphoric acid ester to below a predetermined value include enclosure of procured phosphoric acid ester in a moisture-proof bag, hermetical sealing of a metal or glass vessel containing phosphoric acid ester, and storing of phosphoric acid ester in a vessel with dry gas circulated.

A commonly used drying method may be used for further reducing the moisture content of the phosphoric acid ester. Specific examples thereof way include, but not limited to, hot-air drying, radiation drying, conductive drying and vacuum drying methods. Examples of apparatuses used therein may include, but not limited to, hopper dryers, shelf dryers, ventilating dryers, stirring dryers and dryers with continuous transfer of hot air. Particularly, solid phosphoric acid ester is preferably dried at a temperature equal to or lower than its melting point with circulated dry gas.

(Carboxyl Group-Capping Agent)

The polyglycolic acid resin composition may contain a carboxyl group-capping agent for further improving the moisture resistance, which is preferably used in a proportion of 0.01-10 wt. parts, further preferably 0.1-2.0 wt. parts, particularly preferably 0.2-1.0 wt part, per 100 wt. parts of polyglycolic acid resin as the main component.

The carboxyl group-capping agent may comprise carbodiimide compounds, inclusive of monocarbodiimides and polycarbodiimides, such as N,N-2,6-diisopropyl-phenyl-carbodiimide; oxazoline compounds, such as 2,2'-m-phenylene-bis (2-oxazoline), 2,2'-p-phenylene-bis(2-oxazoline), 2-phenyl-2-oxazoline, and styrene-isopropenyl-2-oxazoline; oxazine compounds, such as 2-methoxy-5,6-dihydro-4H-1,3-oxazine; and epoxy compounds, such as N-glycidylphthalimide, cyclohexene oxide, and triglycidyl isocyanurate.

These carboxyl group-capping agents can be used in combination of two or more species as desired.

(Other Additive Agents)

It is possible to add an other additive agents or thermoplastics, within an extent of not adversely affecting of this invention, such as a plasticizer, a thermal radiation absorber, an ultra-violet ray absorber, an oxygen absorber, and a crystal-nucleus agent, etc. Conventional techniques may be used for addition of the above-mentioned components.

(Mixing)

Preferably, the aliphatic polyester resin and the dry phosphoric acid ester compound are blended at a temperature from room temperature to a temperature higher than the melting point of the phosphoric acid ester compound (provided that the temperature is lower than the melting point of the aliphatic polyester resin) using a general-purpose blender, such as a tumbler, Henschel, rotor or ribbon blender, which has been rendered humidity-proof with dry air or nitrogen, and then subjected to the subsequent melt-mixing step. As described later, these components may be added and mixed in a solid or liquid state from a hopper or the like during melt-mixing.

(Melt Kneading)

A convention means, such as a continuous mixer, for example, a single-screw extruder or a twin-screw extruder (parallel conical type), may effectively be used for melt kneading the aliphatic polyester resin and the dry phosphoric acid ester compound. The screw(s) used in the melt kneading may be full flight screws having a shallow or deep groove or segment screws capable of adjusting the degree of kneading as desired. The melt-kneading temperature is usually preferably 100 to 300° C. while it may depend on the composition of the resin or the type of an additive.

(The Addition Method of an Additive Agent)

Adoptable methods includes: continuously supplying a compound of the aliphatic polyester resin and the dry phosphoric acid ester compound at a predetermined rate using a continuous feeder from a hopper of a molding machine, or involves continuously supplying the aliphatic polyester resin and the dry phosphoric acid ester compound separately at predetermined rates from separate continuous feeders. In the latter method, the phosphoric acid ester compound may be added continuously in a melted state. A gear pump, for example, may be effective for this supply. Alternatively, in the case of adding a small amount of phosphoric acid ester in the aliphatic polyester resin, it is possible to adopt a method of preparing a masterbatch containing a high concentration of phosphoric acid ester as by powder blending or melt-mixing and pelletization of the aliphatic polyester resin and the phosphoric acid ester and continuously adding the masterbatch to the remainder of the aliphatic polyester resin.

This masterbatch method can also be adopted when another additive is further melt-mixed in the composition. A plurality of additives to be introduced can be reacted disadvantageously with each other. In such a case, it is effective to supply these additives from separate points. Specifically, the additives maybe easily added during the processing along the extruder. The extruder is not particularly limited, for example, with respect to the L/D (length/diameter ratio) or design of its screw(s) as long as mixing or reaction after the addition is sufficiently achieved. As for the order of addition, it is desirable to first introduce a thermal stabilizer such as the phosphoric acid ester compound. In an alternatively adoptable method, an aliphatic polyester resin composition once prepared by melt-mixing with an additive can be re-melt-mixed with another additive.

(Strand Take-Up and Pelletizing)

In a method for pelletization, the strands of the thus melt-kneaded extruded product may be slowly cooled, while drawing the strands using a conventional conveyor or a mesh conveyor, or cooled forcedly by blowing of air on a conveyor or by mist spraying. Alternatively, a conventional cooling/drawing method can also be adopted, which involves directly dipping the strands in a water bath (preferably of 10° C. to 70° C.), taking the strands out of the bath and then removing water attached thereto by blowing of air. Means such as a blower, may be effectively used for adjusting the cooling rate or removing water droplets. The cooled strands are cut into pellets of a predetermined size using a conventional strand cutter.

(Drying and Heat Treatment of Pellet)

The thus-obtained pellet contains adsorbed water depending on the manner of cooling the strands and the working environment.

Aliphatic polyester resins are generally hydrolyzable. Their gas-barrier properties or mechanical strengths are disadvantageously reduced as they are hydrolyzed. Also, the pelletized aliphatic polyester resin composition contains unreacted monomers, etc., which might promote hydrolysis, and a subsequent use thereof can be limited thereby. An apparatus for drying treatment such as a dehumidifying hopper dryer, a paddle dryer, a rotary dryer, a vibrating dryer, a PV mixer, an SV mixer, a double-cone dryer, a shelf dryer, a vacuum dryer, a Henschel mixer, a drum dryer or a rotary kiln, may be adopted for removing such water or unreacted monomers.

The drying treatment may be effectively performed immediately after the pelletization because the adsorbed water is present on the surface of the resin. For this treatment, the drying temperature may be equal to or higher than room temperature, preferably 40° C. to 150° C. The drying time is 30 minutes to 80 hours, preferably 2 hours to 48 hours. The temperature at which the unreacted monomers are removed is preferably between 100° C. and the melting point of the aliphatic polyester resin composition. A higher temperature allows removal of the unreacted monomers in a shorter time, but is liable to promote coloring of the resulting composition. Thus, the temperature needs to be adjusted according to the composition of the resin and the formulation of additives. The drying and unreacted monomer removal treatments can be performed efficiently by blowing of dry air or nitrogen gas (having a dew point of 10° C. or lower, preferably 0° C. or lower, particularly preferably −20° C. or lower) whose temperature has been adjusted to or near the treatment temperature.

EXAMPLE

Hereinafter, the present invention will be described more specifically with Examples, Comparative and References. The values or properties described herein were measured by the following methods:

(Adjustment of Moisture Content of Phosphoric Acid Ester)

An equimolar mixture of mono- and di-stearyl phosphate ("ADK STAB AX-71" manufactured by ADEKA Corp.) was dried as follows to prepare several types of phosphoric acid esters (Examples 1 to 4) differing in moisture content.

Example 1

Dried at 50° C. for 4 hours in an oven placed in an environment with a dew point of −49° C. and a temperature of 20° C.

Example 2

Dried at 50° C. for 4 hours in an oven placed in an environment of a temperature of 20° C. and 40% relative humidity.

Example 3

Dried at 50° C. for 4 hours in an oven placed in an environment of a temperature of 35° C. and 50% relative humidity.

Example 4

Left in dry air without particular adjustment.

COMPARATIVE EXAMPLE

Left for 1 day after placement in a thermohygrostat giving an environment of 30° C. and 80% relative humidity, as hot and humid conditions.

(Measurement of Moisture Content)

The moisture content was measured by a Karl Fischer moisture meter (KF) with respect to about 2 g of accurately weighed phosphoric acid ester (each of Examples 1-4, and Comparative):

Apparatus: "CA-100" made by Mitsubishi Chemical Corporation (evaporator: "VA-100")
Vaporization temperature: 80° C.
Carrier gas: nitrogen, 250 ml/min
End sense: Measurement was terminated when a measured value decreased down to the background +0.05 μg/s.

As a result, as shown in Table 1, the moisture contents of phosphoric acid esters were measured at: 0.10 wt. % in Example 1, 0.23 wt. % in Example 2, 0.47 wt. % in Example 3, 0.76 wt. % in Example 4, and 1.80 wt. % in Comparative Example.

Moisture content measurement of PGA hereinafter described was also carried out according to the above described method except that the vaporization temperature was changed to 220° C.

(Production of PGA Composition)

PGA (made by KUREHA Corporation; $Mw=19\times10^4$, moisture content of 43.4 ppm)/100 g, Phosphoric acid ester (each of Examples 1-4, and Comparative)/0.02 g (200 ppm), and N,N-2,6-diisopropylphenyl carbodiimide (CDI) (product "DIPC" made from Kawaguchi Chemicals)/0.3 g (0.3 phr) were melt-kneaded through a twin screw extracted set at temperatures of 220-250°, and shaped into a pellet. After that these pellets were heat-treated under the conditions of 180° C.×35 hr, and the containing monomer was removed.

(Evaluation of Moisture Resistance)

The obtained pellets of each PGA composition were pressed into a sheet at 280° C. and exposed in an environment of to a 50° C. and 90% RH. The weight-average molecular weight (Mw) was measured at each predetermined point of time by a method shown below. An approximate curve of Mw versus time was then prepared, as by the least square method, from the obtained results to calculate a molecular weight-retention time in which the initial weight-average molecular weight ($Mw=19\times10^4$) of PGA decreased down to $Mw=7\times10^4$. Measured values of molecular weight retention time for each of the PGA compositions are shown in Table 1. FIG. 1 shows a graph of the results of Table 1.

Incidentally, even in case where a PGA composition having an initial Mw other than $19\times10^4$ is used, the molecular weight-retention time down to $Mw=7\times10^4$, referred to herein, is determined as a value interpolated or extrapolated to an initial $Mw=19\times10^4$ on the Mw—time approximation curve.

(Measurement of Molecular Weight (Mw))

About 10 mg of a sheet-form of PGA composition was cutting out, and dissolved in 10 mL of hexafluoroisopropanol (HFIP) containing sodium trifluoroacetate dissolved therein at 5 mM. The resultant solution was filtrated through a 0.1 μm-membrane filter made of polytetrafluoroethylene and then injected in a volume of 20 μL into a GPC apparatus for measurement of molecular weight under the following conditions.

(Condition of GPC Measurement)

Apparatus: "Shodex-104" made by Showa Denko K.K.
Column: Two columns of "HFIP-606M" were connected in series with 1 column of "HFIP-G" as a pre-column.
Column temperature: 40° C.
Elution liquid: HFIP solution containing sodium trifluoroacetate dissolved at 5 mM.
Flow rate: 0.6 ml/min.
Detector: RI (differential refractive index) detector.
Molecular weight calibration: Effected by using 5 species of standard polymethyl methacrylate having different molecular weights.

Figure 2:
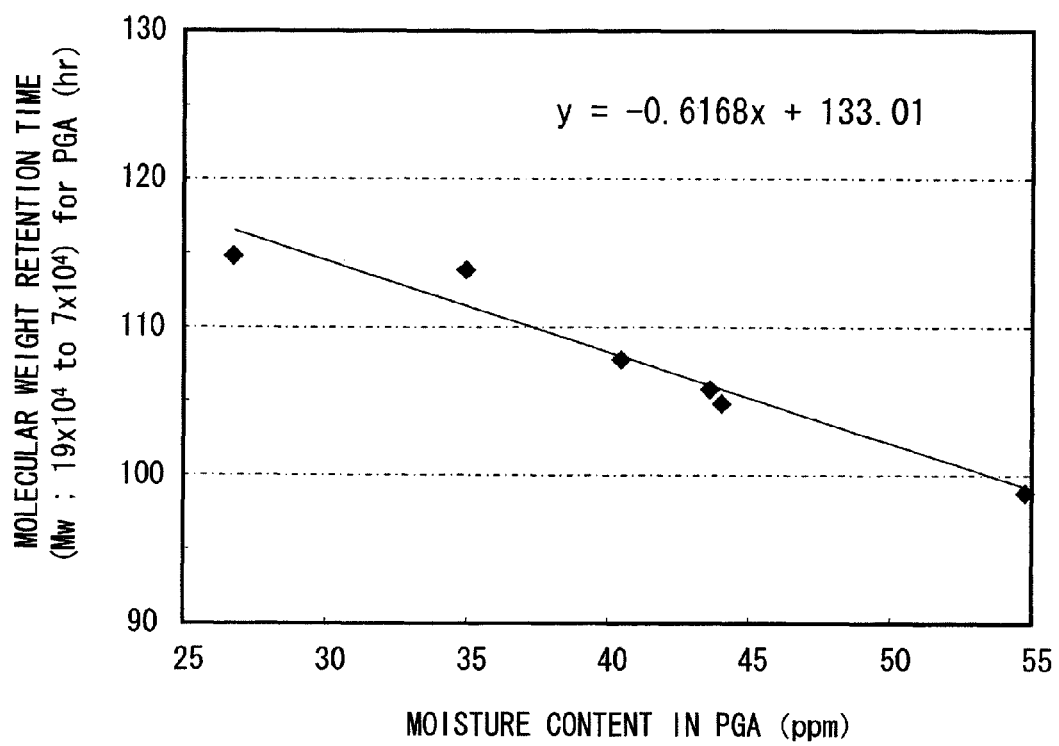
FIG. 2 shows a relation between moisture content (ppm) of a PGA, and a molecular weight retention time down to a weight-average molecular weight (Mw) of $7 \times 10^4$ from $19 \times 10^4$ of PGA.

As shown in Table 2 as References, starting PGA compounds differing in moisture content (Reference 1 to 6) were prepared. A molecular weight retention time (down to $Mw=7\times10^4$) from the initial molecular weight ($Mw=19\times10^4$) of each PGA was determined as described above. FIG. 2 shows a graph of the results of Table 2.

Incidentally, it has been known heretofore that a polyglycolic acid resin composition prepared from a starting PGA having a higher moisture content has a larger degradation rate.

A PGA composition generally contains only about 200 ppm of phosphoric acid ester with respect to PGA as its principal component. In view of this fact, if the moisture content of the phosphoric acid ester changes by 1 wt. %, it changes by only about 2 ppm in the whole PGA composition.

As seen from the results of FIG. 2, the down to $Mw=7\times10^4$ due to a 2 ppm change in the moisture content of the PGA composition is only about 1.2 hours. By contrast, as seen from the results of FIG. 1, the change in molecular weight retention time due to a 1 wt. % change in the moisture content of the phosphoric acid ester amounted to about 16 hours.

From these results, it has been found that phosphoric acid ester mixed after a drying step into PGA remarkably improves the moisture resistance of the resulting PGA composition.

TABLE 1

|   |   | Moisture content in phosphoric acid ester (wt %) | Molecular weight retention time (hr) (down to $7 \times 10^4$) |
|---|---|---|---|
| (1) | Example 1 | 0.10 | 134 |
| (2) | Example 2 | 0.23 | 131 |
| (3) | Example 3 | 0.47 | 127 |
| (4) | Example 4 | 0.76 | 123 |
| (5) | Comparative | 1.80 | 106 |

TABLE 2

|   | Moisture content in PGA (ppm) | Molecular weight retention time (hr) (down to $7 \times 10^4$) |
|---|---|---|
| Reference 1 | 26.8 | 115 |
| Reference 2 | 35.0 | 114 |
| Reference 3 | 40.5 | 108 |
| Reference 4 | 43.7 | 106 |
| Reference 5 | 44.1 | 105 |
| Reference 6 | 54.8 | 99 |

INDUSTRIAL APPLICABILITY

The present invention, as described above, provides a process for producing a polyglycolic acid resin composition excellent in moisture resistance. This process can produce a polyglycolic acid resin composition having improved moisture resistance and stable quality.

What is claimed is:

1. A process for producing an aliphatic polyester resin composition, comprising the steps of:
    drying a phosphoric acid ester with a particle diameter of at most 3.0 mm with dry gas set to a temperature equal to or lower than a melting point of the phosphoric acid ester to a reduced moisture content of 0.7 wt. % or less; and
    melt-kneading an aliphatic polyester resin with the dried phosphoric acid ester.

2. The process according to claim 1, wherein 0.003-3 wt parts of the phosphoric acid ester is melt-kneaded per 100 wt. parts of the aliphatic polyester resin.

3. The process according to claim 1, wherein the phosphoric acid ester is a phosphoric acid ester having a hydroxyl group and a long-chain alkyl ester group, or a pentaerythritol skeleton.

4. The process according to claim 1, wherein the aliphatic polyester resin is melt-kneaded with a carboxyl group-capping agent in a proportion of 0.01-10 wt. parts, per 100 wt. parts of the aliphatic polyester resin, in addition to the phosphoric acid ester.

5. The process according to claim 1, wherein the aliphatic polyester resin is a polyglycolic acid resin.

6. An aliphatic polyester resin composition produced by the process according to claim 1, having a molecular weight retention time down to a weight-average molecular weight (Mw)=$7\times10^4$ of 120 hours or more in an environment of 50° C. and 90% RH.

7. The aliphatic polyester resin composition according to claim 6, wherein the aliphatic polyester resin is a polyglycolic acid resin.

* * * * *